United States Patent Office

3,647,893
Patented Mar. 7, 1972

3,647,893
PROCESS FOR THE PREPARATION OF ALKYL
AND ARYL IODINE
Leonard S. Silbert, Apt. 105, Pastorious Bldg. 7800C,
Stenton Ave., and Daniel Swern, 7803 Rugby St., both
of Philadelphia, Pa. 19118
No Drawing. Original application Feb. 28, 1968, Ser. No.
708,800. Divided and this application Mar. 23, 1970,
Ser. No. 24,922
Int. Cl. C07c 79/12, 25/04
U.S. Cl. 260—646     7 Claims

ABSTRACT OF THE DISCLOSURE

Alkyl and aryl iodides are prepared by the decomposition of the corresponding acyl and aroyl peroxides in iodine solutions of selected solvents. Aryl iodides are prepared in high yields by complete decomposition in two hours at 110° C. of aroyl peroxides in iodine solutions of solvents such as 1,1,2,2-tetrachlorodifluorethane (Freon 112), 1,3-dichloropropane and 1,3-dibromopropane. Chlorobenzene, 1-iodobutane and Freon 112 are preferred solvents for the decomposition of aliphatic acyl peroxides but good yields are obtained using a number of other aromatic and aliphatic solvents such as anisole, toluene, benzene, 1-chloro-3-fluorobenzene, 1,3-dichloropropane, 1,2-dichloroethane, 1-chlorohexane and 1-iodopropane.

---

This application is a division of application Ser. No. 708,800, filed Feb. 28, 1968 and now abandoned.

A non-exclusive, irrevocable, royalty-free license in the invention herein described, throughout the world for all purposes of the United States Government, with the power to grant sublicenses for such purposes, is hereby granted to the Government of the United States of America.

This invention relates to aromatic and aliphatic iodides and more specifically to a novel process for preparing these compounds from their corresponding aroyl and acyl peroxides.

Organic iodides such as cetyl trimethyl ammonium iodide and cetyl pyridinium iodide that can be prepared by the method of this invention find use as disinfectants and germicides. Others, such as cetyl iodide react with tertiary amines to form tetraalkyl ammonium iodide salts which are used as supporting electrolytes in polarography. Iodides are also used as dyes such as erythrosin and Rose Bengal, as photographic sensitizers such as the cyanine dyes and in compounds of medical interest such as thyroxin and iodoform. The iodides also find use as intermediates in the preparation of other compounds. Nucleophilic displacement reactions of the iodides yield other compounds such as sulfonic acid esters, nitro derivatives and mercaptans.

The mechanism of the decomposition of aroyl and acyl peroxides in solution has been extensively investigated. Trapping agents such as iodine have often been used in these decomposition studies in order to elucidate the kinetics of the decomposition by their ability to remove the free radicals by chemical combination. The preparation of iodobenzene from the decomposition of benzoyl peroxide in carbon tetrachloride in the presence of iodine has been demonstrated by Hammond [J.A.C.S. 72, 4711 (1950)] who also conducted the reaction in benzene and chlorobenzene solutions but obtained very poor yields [J.A.C.S. 72, 3737 (1950)]. The disadvantages of Hammond's method are the long reaction times, 36–48 hours, for complete decomposition to occur in carbon tetrachloride and the failure of aromatic compounds such as benzene and chlorobenzene to be useful because of their susceptibility to peroxide and iodine attack under the reaction conditions.

The reaction of acyl peroxides with iodine has not previously been demonstrated to be applicable as a preparative method of alkyl iodides. However, aliphatic acyl peroxide decompositions were studied with acetyl peroxide in the gas phase containing iodine vapor and in solution [J.A.C.S. 77, 3486 (1955) and J.A.C.S. 83, 2782 (1961)], but were not studied with longer chain, non-volatile derivatives. The long chain acyl peroxides cannot be vaporized without decomposing so they must be studied in solution.

An object of this invention is to provide a novel means of preparing aryl and alkyl iodides in good yields from the reaction of aroyl and acyl peroxides with iodine.

Another object of this invention is to provide a relatively rapid process for preparing aryl and alkyl iodides by reaction of aroyl and acyl peroxides with iodine.

Still another object of this invention is to provide solvents which enhance the production of optimum product yields when used as the medium in which aroyl and acyl peroxides are reacted with iodine.

In general, according to the present invention, alkyl and aryl iodides are synthesized by the decomposition of their corresponding peroxides in iodine solutions of selected solvents. Aryl iodides are prepared in high yields by complete decomposition in two hours at 110° C. of aroyl peroxides in iodine solutions of solvents such as 1,1,2,2-tetrachlorodifluorethane (Freon 112), 1,3-dichloropropane and 1,3-dibromopropane. The acyl peroxides are less dependent solvent type than the aroyl peroxides and good yields of acyl iodides are obtained using a greater range of solvents than can be used in the reaction of aroyl peroxides.

The use of carbon tetrachloride as the solvent for the reaction of aroyl or acyl peroxides with iodine offers a number of serious disadvantages. For example, iodine and many peroxides have allowed solubility in carbon tetrachloride. At 50° C. solubility of iodine is approximately 0.28 molar as compared to 1.0 molar in benzene. The low boiling point (76.8° C.) of carbon tetrachloride precludes a rapid decomposition of the peroxide and requires up to 65 hours for completion at 76.8° C. depending on the thermal stability of the peroxide. Poor solubility of both iodine and peroxides in carbon tetrachloride prohibits the use of concentrated solutions; this obviates economical use of solvent, while the larger amounts needed for dissolution of all components allows increased competitive reaction of peroxide and iodine on solvent as a deleterious side reaction.

Solution of the peroxide is necessary for the desired reaction because thermal breakdown of any undissolved peroxide leads to hydrocarbon and ester products by intra- and intermolecular peroxide reactions in the solid phase. Furthermore, the temperature of the reaction is important because the rate of peroxide decomposition increases with temperature. This increased rate can be achieved in carbon tetrachloride solution only by pressurizing the system in special equipment or by conducting the reaction in sealed ampoules. Even when this is done, many peroxides do not dissolve in carbon tetrachloride at the desired concentrations.

In order to be useful the solvent must dissolve iodine and peroxide in the desired concentrations and must have a boiling point in a range (90–130° C.) in which the rapid and complete decomposition of aroyl and acyl peroxides is effected. In addition, the solvent must be relatively inert to peroxide and iodine attack under the conditions of the reaction. Many solvents capable of readily dissolving the reactants and having boiling points in the desired temperature range cannot be used because of their susceptibility to free radical attack by benzoate or phenyl radicals. Aromatic solvents and certain aliphatic solvents such as N,N - dimethylacetamide, iodoalkanes and very highly chlorinated alkanes are attacked by free radicals and permit only poor yields of the desired iodobenzene.

Although carbon tetrachloride is an excellent solvent for benzoyl peroxide, it is an inadequate solvent for iodine and for many other peroxides and as previously stated it is a poor solvent in which to decompose the aroyl and acyl peroxides because the low boiling point requires many hours for completion of the reaction. Consequently, the fact that other halogenated hydrocarbons such as 1,3-dichloropropane, 1,3 - dibromopropane, and 1,1,2,3-tetrachlorodifluorethane (Freon 112) can be substituted for carbon tetrachloride to obtain high yields of product in 1 to 2 hours is completely unexpected. In addition, especially since it is well established that acyl peroxide attack aromatic compounds, it is also totally unexpected that aromatic solvents can be used for the reaction of aliphatic peroxides and that chlorobenzene is one of the best solvents for this reaction. Also unexpected is that alkyl iodides are effective solvents for the reaction of aliphatic peroxides especially since these solvents degraded when used for reaction of the aromatic peroxides.

The following typical methods of preparing iodides exemplifies the manner in which the invention was reduced to practice.

TYPICAL METHOD OF PREPARING IODOBENZENE

Benzoyl peroxide (0.05 mole) and iodine (0.055 mole) were heated at 100° for 4 hours in Freon 112 (110 ml.). Free iodine was removed after reaction in classical fashion by addition of 50% acetic acid (20 ml.), dropwise addition of concentrated sodium thiosulfate and water washing the solution. Iodobenzene (65% yield) was obtained by vacuum distillation of the Freon layer. Freon 112 is a useful solvent for preparing the iodides because its low boiling point permits easy separation from iodobenzene by distillation.

TYPICAL METHODS OF PREPARING OTHER IODIDES

4-iodonitrobenzene

4 - nitrobenzoyl peroxide (0.0075 mole) and iodine (0.0083 mole) were heated in 1,3-dichloropropane (16 ml.) at 120° for two hours. Solvent and iodine were evaporated in a rotary evaporator by heating the mixture under reduced pressure (water aspiration). The solids were chromatographed on a column containing silica gel and eluted with petroleum ether containing benzene whose concentration was successively increased from 5 to 50%. Yield of 4-iodonitrobenzene was 70%; M.P. 173° C.

3-iodonitrobenzene 3-nitrobenzoyl peroxide was decomposed in analogous fashion to yield 3-iodonitrobenzene in 60% yield; M.P. 36° C.

1-iodotridecane

Myristoyl peroxide (0.02 mole) and iodine (0.03 mole) were heated in chlorobenzene (30 ml.) for 2 hours at 120° C. After cooling, ethyl ether was added and iodine removed by sodium thiosulfate treatment. The solution was filtered and the ether was distilled off. 1-iodotridecane (45% yield) was isolated by vacuum distillation.

The results of decompositions of benzoyl and pelargonyl peroxides in the presence of iodine (50% molar excess) in aromatic and aliphatic solvents are shown in Tables I and II in which are listed molar percent iodobenzene or iodooctane, as well as molar percent of iodine consumed in each solvent system.

Although aromatic solvents are generally poor media for the benzoyl peroxide-iodine reaction, substituents on the solvent molecule strongly affect peroxide conversion to iodobenzene. The conversion, already low in benzene (18%), approaches zero in aromatic solvents containing electron-donating groups, like methoxyl, and increases in those solvents containing electron-withdrawing groups like nitro and halogen (Table II). The best aromatic solvent in this series is 1-chloro-3-fluorobenzene in which a fair conversion to iodobenzene (57%) is obtained.

Aliphatic solvents containing halogen substituents (Table I) are the most useful media for this reaction. The best yields of iodobenzene (87%) were obtained in carbon tetrachloride at its boiling point but this reaction required 65 hours. Of the aliphatic solvent systems studied, peroxide conversions to iodobenzene comparable to those in carbon tetrachloride were obtained in 1,3-dichloropropane, 1,3-dibromopropane and Freon 112. Lower conversions (70%) were obtained in alkyl chloride and alkyl bromide solutions but alkyl iodides are unsatisfactory because they are readily attacked by benzoyl peroxide with liberation of iodine.

Pelargonyl peroxide completely decomposed within 2 hours at 100–110° C. in iodine solutions of most of the solvents studied compared with 16 hours in carbon tetrachloride at 75° C. and with 10 hours in benzene at 80° C. Conversions to iodooctane in both aromatic and aliphatic solvents were surprisingly comparable (Table II) and, with the exception of nitrobenzene, were accompanied by little, if any, additional iodine consumption by the solvents. The utility of aromatic compounds and alkyl iodides as solvents for the acyl peroxide-iodine reaction contrasts sharply with the corresponding benzoyl peroxide reaction systems. Chlorobenzene, 1-iodobutane and Freon 112 are preferred solvents for aliphatic acyl peroxides.

The reaction was extended to a few additional examples of aroyl and acyl peroxides. 3-nitrobenzoyl peroxides, 4-nitrobenzoyl peroxide and myristoyl peroxide gave 1-iodo-3-nitrobenzene, 1 - iodo - 4 - nitrobenzene and 1 - iodotridecane, respectively. Conversions and yields of isolated product are recorded in Table III.

TABLE I

Reaction of Benzoyl Peroxide with Iodine in Various Solvents: Conversion to Iodobenzene [a]

|  | Percent Iodo-benzene | Percent iodine consumed |
|---|---|---|
| Aromatic solvents: |  |  |
| Anisole [b] | 1.3 | 35 |
| Toluene | 13.5 | 18 |
| Benzene [c] | 18 | 19 |
| Chlorobenzene [d] | 37 | 64 |
| 1-chloro-3-fluorobenzene | 57 | 83 |
| Nitrobenzene [e] | 32 | 78 |
| Aliphatic solvents: |  |  |
| Carbon tetrachloride [f] | 87 | 90 |
| Freon 112 [g] | 83 | 83 |
| 1,3-dichloropropane | 83 | 88 |
| 1,3-dibromopropane | 80 | 84 |
| 1,2-dichloroethane [h] | 77 | 84 |
| 1,1,2,2-tetrachloroethane | 57 | 56 |
| 1-chlorohexane | 71 | 75 |
| 1-bromobutane [i] | 71 | 69 |
| 1-iodobutane | 14 | (j) |

[a] Reaction conditions: benzoyl peroxide (0.4 M); iodine (0.6 M); 110° C., 2 hours (complete peroxide decomposition).
[b] Methoxyphenyl benzoates (14.4%) and iodoanisoles (33.7%) were also formed.
[c] 48 hrs. at 80° C., phenyl benzoate formed, 72%.
[d] Chlorophenyl benzoates (12.6%) and chloroiodobenzenes (31%) were also formed.
[e] No nitrophenyl benzoate was formed; iodonitrobenzenes obtained, 33%.
[f] 65 hrs. at 75° C.; 0.2 M benzoyl peroxide.
[g] 4 hrs. at 100° C.
[h] 16 hrs. at 85° C.
[i] 4 hrs. at 100 ° C.
[j] Iodine was liberated from solvent to the extent of about 0.4 mole per mole of peroxide.

TABLE II

Reaction of Pelargonyl Peroxide with Iodine In Various Solvents; Conversion To Iodooctane [a]

| | Percent Iodooctane | Percent iodine consumed |
|---|---|---|
| Aromatic solvents: | | |
| Anisole | 62 | 63 |
| Toluene | 62 | 66 |
| Benzene [b] | 60 | 63 |
| Chlorobenzene | 66 | 66 |
| 1-chloro-3-fluorobenzene | 66 | 66 |
| Nitrobenzene | 42 | 54 |
| Aliphatic solvents: | | |
| Carbon tetrachloride [c] | 62 | 71 |
| Freon 112 [d] | 61 | 66 |
| 1,3-dichloropropane | 63 | 63 |
| 1,2-dichloroethane | 59 | 64 |
| 1,1,2,2-tetrachloroethane | 56 | 59 |
| 1-chlorohexane | 61 | 66 |
| 1-iodobutane [e] | 61 | 62 |
| 1-iodobutane [f] | 66 | 62 |
| 1-iodopropane | 60 | 66 |

[a] Reaction conditions: pelargonyl peroxide (0.3 M); iodine (0.45 M); 110° C.; 2 hrs. (complete peroxide decomposition).
[b] 10 hrs. at 80° C.
[c] 16 hrs. at 75° C.
[d] 4 hrs. at 100° C.
[e] 24 hrs. at 70° C.
[f] 2 hrs. at 90–110° C.

TABLE III

Reaction of Other Peroxides with Iodine: Yields of Iodo-Compounds

| Peroxide | Product | Yields Glpc | Yields Isolated |
|---|---|---|---|
| 3-nitrobenzoyl [a] | 1-iodo-3-nitrobenzene | 64 | [b] 60 |
| 4-nitrobenzoyl [c] | 1-iodo-4-nitrobenzene | 71 | [b] 70 |
| Myristoyl [c] | 1-iodotridecane | 60 | [d] 45 |

[a] In 1,3-dichloropropane at 120° C. for 2 hours.
[b] By column chromatography on silica gel.
[c] In chlorobenzene at 120° C. for 2 hours.
[d] By vacuum distillation.

We claim:

1. A process for preparing aryl iodides comprising decomposing aroyl peroxides selected from the group consisting of benzoyl peroxide, 3-nitrobenzoyl peroxide and 4-nitrobenzoyl peroxide in the presence of iodine, said iodine being dissolved in a solvent selected from the group consisting of 1,1,2,2-tetrachlorodifluorethane, 1,3-dichloropropane and 1,3-dibromopropane, said decomposition being conducted at a temperature between 90 and 130° C.

2. The process of claim 1 in which the peroxide is benzoyl peroxide.

3. The process of claim 1 in which the solvent is 1,1,2,2-tetrachlorodifluorethane.

4. The process of claim 1 in which the solvent is 1,3-dichloropropane.

5. The process of claim 1 in which the solvent is 1,3-dibromopropane.

6. The process of claim 1 in which the peroxide is 4-nitrobenzoyl peroxide and the solvent is 1,3-dichloropropane.

7. The process of claim 1 in which the peroxide is 3-nitrobenzoyl peroxide and the solvent is 1,3-dichloropropane.

References Cited

Hammond, J.A.C.S., 72, pp. 3737–3743, 1950.
Hammond et al., J.A.C.S., 72, pp. 4711–4715, 1950.
Walling, et al., J.A.C.S., 80, pp. 228–233, 1958

HOWARD T. MARS, Primary Examiner

US. Cl. X.R.

260—650 R, 652 R